Aug. 7, 1928.
W. J. POPE
1,680,064
FERTILIZER DISTRIBUTOR
Filed March 10, 1926  2 Sheets-Sheet 1
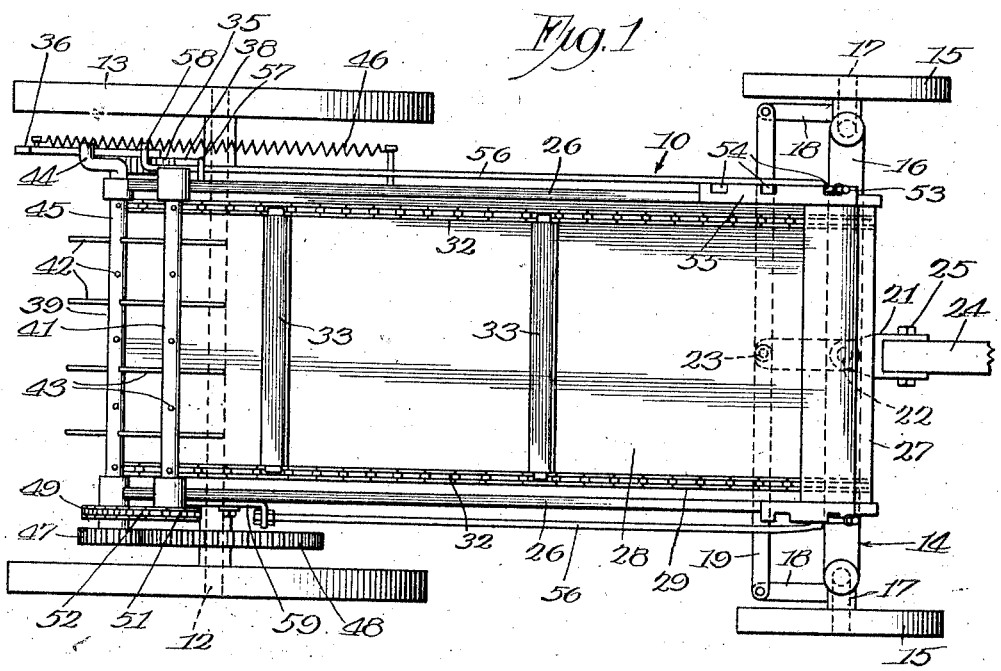
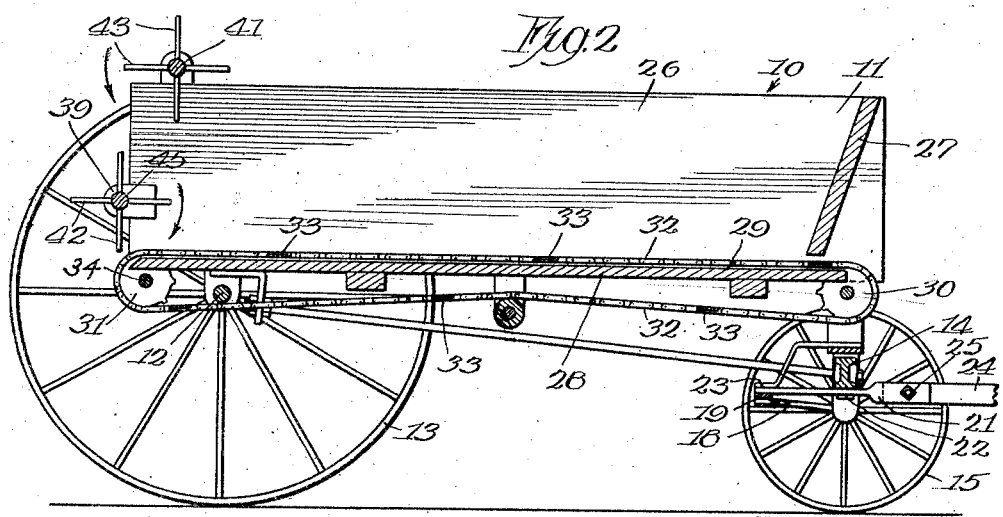
Inventor:
William J. Pope
By Gillson Mann & Cox Att'ys Aug. 7, 1928.

W. J. POPE 1,680,064

FERTILIZER DISTRIBUTOR

Filed March 10, 1926    2 Sheets-Sheet 2

Inventor:
William J. Pope
By Gillson, Mann & Cox, Attys

Patented Aug. 7, 1928.

1,680,064

UNITED STATES PATENT OFFICE.

WILLIAM J. POPE, OF PLANO, ILLINOIS.

FERTILIZER DISTRIBUTOR.

Application filed March 10, 1926. Serial No. 93,594.

This invention relates to manure spreaders or fertilizer distributors, and more particularly to the operating and controlling mechanism therefor. One of the objects of the invention is the provision of new and improved mechanism for intermittently advancing the fertilizer conveyor.

Another object of the invention is the provision of new and improved means for advancing or changing the operation of the conveyor mechanism at the will of the operator.

A further object of the invention is the provision of new and improved means for throwing the operating mechanism into and out of gear.

A still further object of the invention is the provision of a new and improved fertilizer distributor that is simple in construction, cheap to manufacture, readily assembled, efficient in operation, easily manipulated, composed of few moving parts, and that is not likely to become broken or get out of order.

Other and further objects and advantages of the invention will appear from the following description taken in connection with the accompanying drawings, in which Fig. 1 is a plan view of the device;

Fig. 2 is a longitudinal vertical section thereof;

Figure 3:
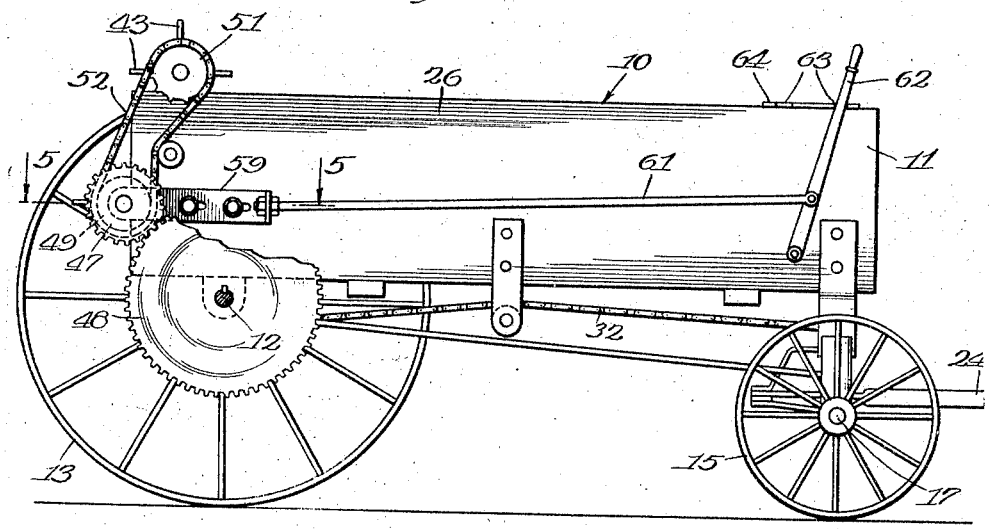
Fig. 3 is a side elevation thereof, with the rear wheel removed and the axle in section, and with parts broken away.
Figure 4:
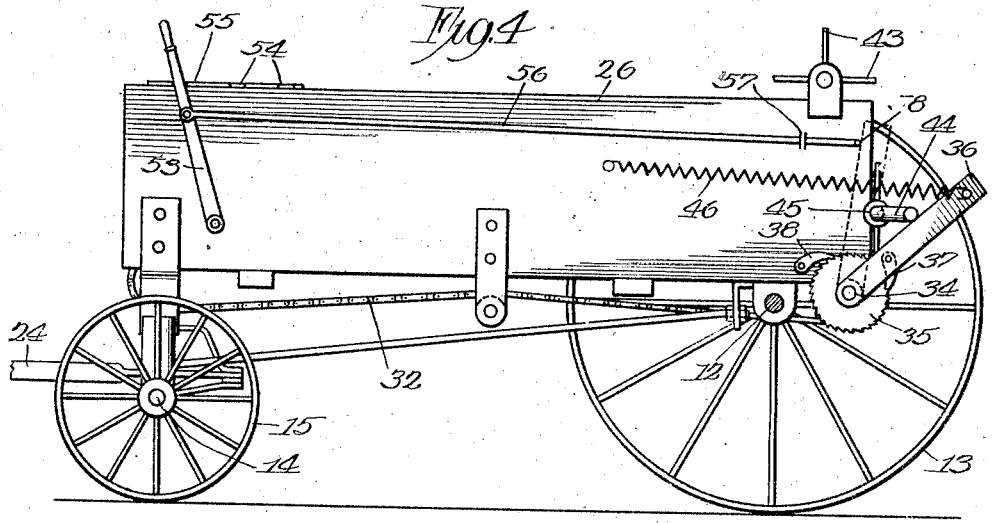
Fig. 4 is a side elevation, with one of the rear wheels removed and the axle in section.
Figure 5:
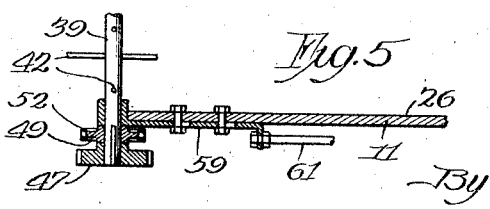
Fig. 5 is a detail view on line 5—5 of Fig. 3.

On the drawings the reference character 10 designates a vehicle on which the distributor mechanism is mounted, and comprises a body 11 which is adapted to be supported at the rear end by the axle 12 and wheels 13 in the usual manner. The front end of the body is supported by the front axle 14 and the wheels 15. The front axle 14 is constructed after the manner of the front axle of an automobile and comprises the intermediate section 16 on which the front end of the body is mounted, and stub axles 17 which are pivotally connected to the ends of the intermediate section 16. The stub axles are each provided with a rearwardly extending arm 18 rigidly connected thereto. The arms 18 are pivotally connected together by the drag link 19. A tongue member 21 is pivotally connected to the axle 14 as at 22 and is provided with a rearward extension which is pivotally connected to the drag link as at 23. A tongue 24 is pivotally connected to the tongue member 21 as at 25.

By means of this arrangement the turning of the tongue 24 will cause a turning movement of each of the stub axles 17 in the direction in which the tongue is turned. This arrangement permits a short turning movement of the vehicle.

The vehicle is provided with a body having the sides 26, the front end member 27 and the bottom member 28. The rear end of the body is left open as is usual in such constructions.

The distributor mechanism is mounted on the body and comprises an endless conveyor 29 which extends about suitable sprockets 30 and 31 at the front and rear ends of the body. The conveyor is of the usual or any well known construction, comprising the sprocket chain 32 at each side of the vehicle which engages the sprockets 30 and 31. The chains are connected together by suitable cleats or strips 33.

Suitable means are provided for intermittently moving the upper run of the conveyor belt rearwardly for carrying the fertilizer to the rear of the body. As shown, the shaft 34 on which the sprockets 30 are mounted is provided with a ratchet wheel 35 rigidly connected thereto at one side of the vehicle. An operating lever 36 is loosely or rotatably mounted on the shaft 34 and is provided with a pawl 37 for engaging the teeth of the ratchet wheel 35. A pawl 38 is adapted to engage the ratchet wheel for holding the same in adjusted position.

The rear end of the body is provided with a rotating distributor 39 and with a rotating beater 41 as is usual in such constructions. These members are provided with arms 42 and 43 respectively, in the usual manner. The distributor member 39 is rotated by means of the gears 47 and 48. The gear 48 is rigidly mounted on the axle 12 or wheel 13 and turns therewith. The beater 41 is operated in any suitable manner from the distributor member. As shown, the shafts of each are provided with sprockets 49 and 51 around which is trained the sprocket chain 52.

Suitable means are provided for oscillating the arm or operating lever 36 for intermittently operating the conveyor. As shown, the distributor member 39 is provided with a crank 44. This crank may, if desired, be formed by extending the shaft 45 of the distributor member 39 and bending the same to form a crank.

A spring or other resilient member 46 secured to the body and to the operating lever 36 tends to hold said lever in a forward position.

In the operation of the device the rotation of the rear wheels will cause the distributor member to rotate, which in turn will cause the crank 44 to move the operating lever 36 rearwardly, and through the pawl 37 rotate the ratchet 35 and with it the sprocket 31 for operating the conveyor. The spring 46 will return the lever as the crank 44 rotates to its forward position.

Suitable means are provided for adjusting the length of each intermittent movement of the conveyor. In the present instance, this is accomplished by providing means for limiting the forward movement of the operating lever during the operation of the device. This is accomplished by a lever 53 pivoted on the body and which is adapted to be held in any one of a plurality of notches 54 on the holding plate 55. A rod 56 attached to the lever 53 at its forward end extends rearwardly through the guide 57 and is provided with a laterally extending portion or bent end 58 which is in the path of movement of the lever 36. When the rod is moved rearwardly the lever 36 will of course have a short movement and consequently the conveyor, while it will be operated regularly, will move but a short distance.

When it is desired that the conveyor be moved its maximum distance at each rotation of the crank 44 the lever 53 is moved forwardly, which will permit a greater movement of the operating lever 36.

It is desirable that means be provided for disengaging the driving mechanism from the distributor. Any suitable means may be employed for this purpose. As shown, one end of the shaft 45 of the distributor member is mounted in a plate 59 which is slidably mounted on the side of the body. The plate 59 is operated by means of a rod 61 which is pivotally connected to a lever 62 mounted on the side of the body. The lever 62 is adapted to engage notches 63 in a holding plate 64. When the lever is moved forwardly it will move the gear 47 into mesh with the gear 48 whereby the device will be operated when the vehicle is pulled along the ground.

When it is desired to throw the device out of gear the lever 62 is moved rearwardly, disengaging the teeth of the gear 47 from those of the gear 48.

In the operation of the device, the fertilizer or manure, such as rotted straw, refuse and the like, is loaded into the body of the machine, and after driving the same to the field where it is to be scattered, the device is thrown in gear, the lever 53 set at the proper adjustment to distribute the required amount of manure per unit of ground surface, and the machine driven over the ground to be fertilized. The force and movement of the vehicle will cause the conveyer belt to advance step by step, carrying the manure rearwardly where the material is loosened by the beater 41 and the manure scattered over the ground by the distributor as the vehicle is pulled along.

If it is desired to distribute the manure thicker over the ground the lever 53 is moved forwardly, which will permit a longer stroke of the lever arm 36 and a consequent longer movement of the conveyer at each rotation of the crank 44.

It is throught from the foregoing taken in connection with the accompanying drawings, that the construction and operation of my device will be apparent to those skilled in the art, and that various changes in size, shape, proportion and details of construction may be made without departing from the spirit and scope of the appended claims.

I claim as my invention:

1. In combination, a vehicle, manure spreader mechanism mounted on said vehicle, said mechanism comprising a rotating distributor having a shaft extending across said vehicle, a conveyor, a conveyor shaft journaled in the rear portion of said vehicle for operating said conveyor, means including a single crank on said first named shaft and a lever intermittently oscillated by said crank for advancing said conveyor step by step, and means extending to the front of the vehicle for adjustably limiting the return of said lever for regulating the rate of movement of said conveyor.

2. In combination, a vehicle, manure spreader mechanism mounted on said vehicle, said mechanism comprising an endless belt conveyer, a shaft at each end of the vehicle over which said belt conveyer is trained, a ratchet wheel rigidly mounted on one of said shafts, a pawl for engaging said wheel, a lever having one end loosely mounted on the ratchet wheel shaft, a pawl carried by said lever and adapted to operate said ratchet wheel and conveyor, a distributor shaft, a crank on said shaft for engaging said lever for moving the same in one direction, means for automatically moving said arm in the opposite direction, and adjustable means for limiting the movement of said lever in the return direction.

3. In a manure spreader, a vehicle having front and rear wheels, a gear, means to cause said gear to rotate with one of said wheels, a distributor member provided with a shaft having a crank on one end thereof, a pinion on the other end of said shaft for engaging said gear, means for disengaging said pinion from said gear, a shaft having sprockets mounted thereon at each end of the vehicle, an endless conveyer member extending about and engaging said sprockets, a ratchet wheel on one of said last-named shafts, a holding pawl for engaging the teeth on said ratchet wheel, a lever pivoted at one end oscillatable in proximity to said ratchet wheel, a working pawl on said lever for engaging the teeth of said ratchet wheel, a spring for holding said lever in the path of said crank, an adjustable stop for limiting the return movement of the lever, and means for adjusting said stop from the front of said vehicle.

In testimony whereof I affix my signature.

WILLIAM J. POPE.